INVENTOR.
*Herald W. Mumby*
BY
*J.C. Evans*
His Attorney

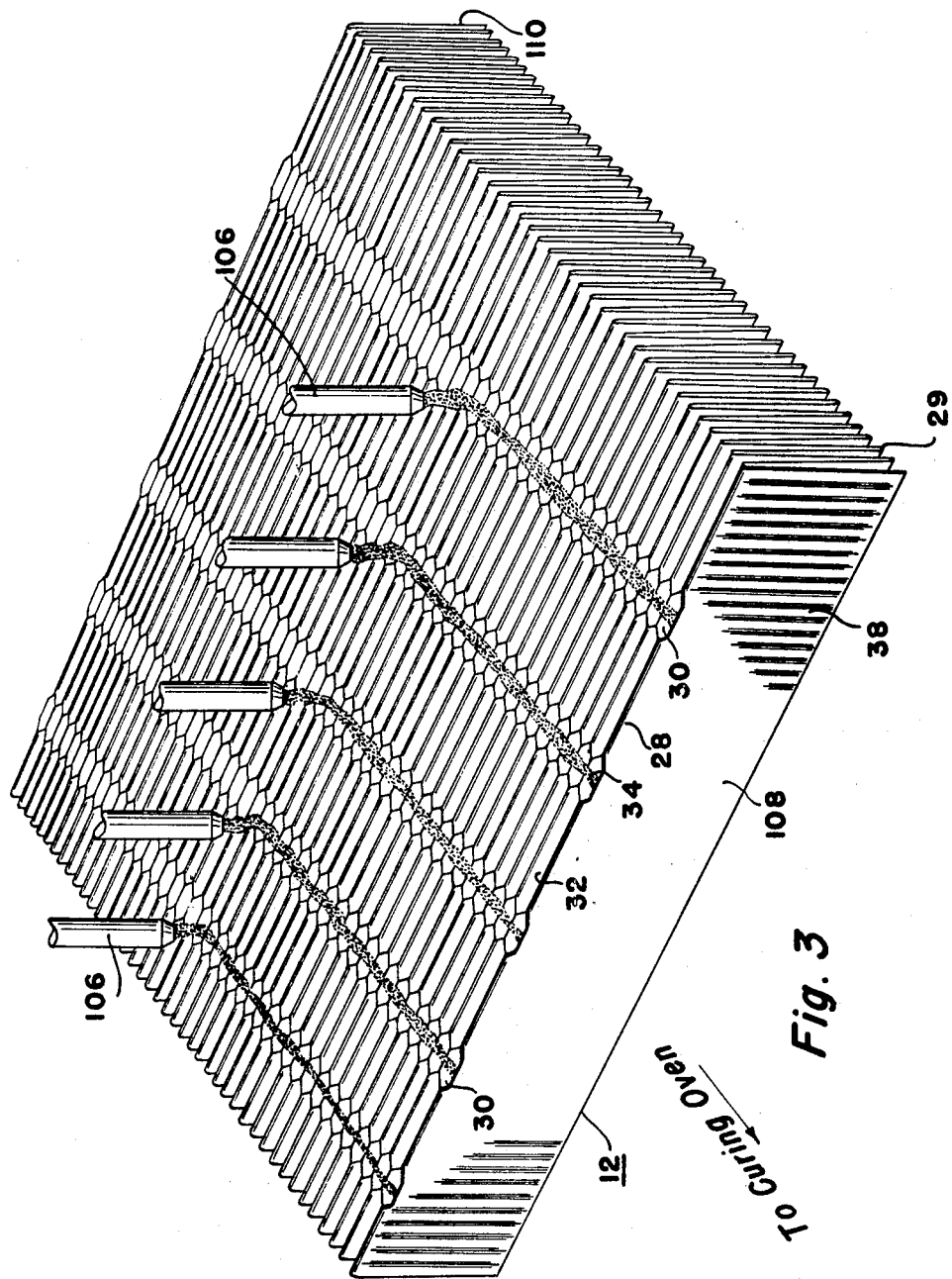

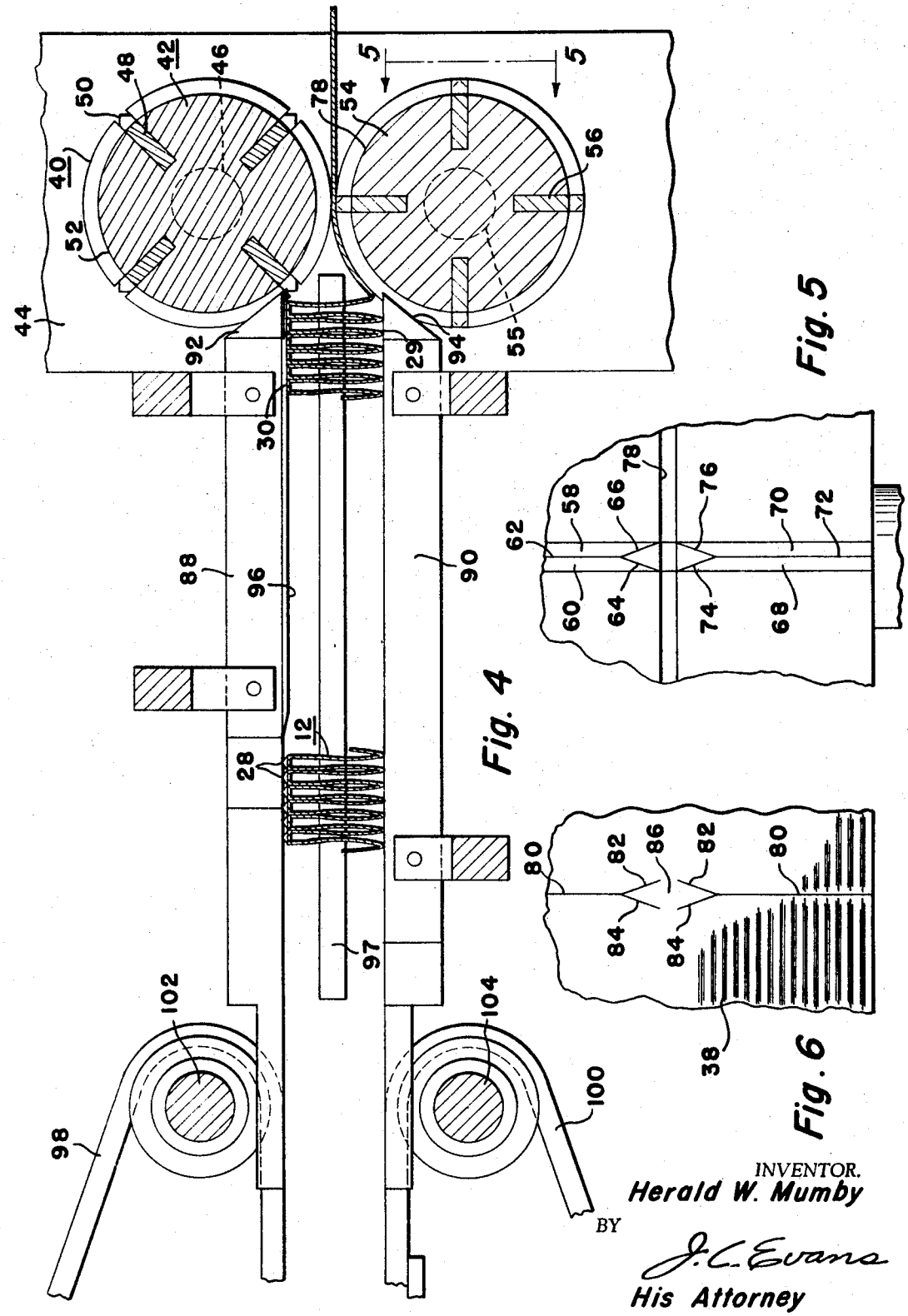

United States Patent Office 3,392,843
Patented July 16, 1968

3,392,843
PLEATED FILTER CARTRIDGE AND ITS METHOD OF MANUFACTURE
Herald W. Mumby, Flint, Mich., assignor to General Motors Corporation, Detroit, Mich., a corporation of Delaware
Filed Oct. 22, 1965, Ser. No. 501,994
4 Claims. (Cl. 210—457)

ABSTRACT OF THE DISCLOSURE

In a preferred form, a disposable filter cartridge including an outer perforated shell, a paper filter element located within the shell including a plurality of pleated portions. Each of said pleated portions including a radial outer edge, each of the radial outer edges including a plurality of radially inwardly directed indentations at spaced apart points thereon, the indentations being aligned circumferentially and in abutting relationship to form a surface for disposing a filter reinforcing adhesive and to space adjacent pleats apart from one another to form inlets to the filter element.

---

This invention relates to a dry cleaning apparatus and more particularly to an improved filter element and method of manufacture thereof for filtering and conditioning dry cleaning solvent.

The public acceptance of self-service dry cleaning apparatus has given rise to many dry cleaning systems. One such system uses a throw-away filter cartridge which is disposed in the path of circulating solvent for removing particulate matter therefrom and for conditioning the solvent by adsorbing dyes or the like. A filter cartridge suitable for use in this growing industry must be efficient, have a long life in cycles of operation and be inexpensive to manufacture. Accordingly, it is an object of this invention to provide an improved filter cartridge for dry cleaning solvent such as perchloroethylene.

Another object of the present invention is to improve filter cartridges for dry cleaning solvent and the like by the provision therein of a folded paper filter element including a plurality of outer fold edges and a plurality of inner fold edges and wherein each of the outer fold edges has a radially directed indentation formed therein to define a flat surface on the fold edges to maintain a predetermined separation between adjacent outer fold edges of the element and wherein certain of the flat surfaces in the outer fold edges are located in circumferentially abutting relationship to form a support for a bead of plastisol adhesive on the outer edge of the filter element that is carried by the indented portions of the folded edges of the filter elements above an interior space between adjacent folds of the element and wherein the adhesive serves to maintain a predetermined length in the filtering element.

A further object of the present invention is to improve replaceable filter cartridges for filtering dry cleaning solvent of the type including a cylindrical, perforated outer shell enclosing a filter paper tube or element having a plurality of folds or pleats along the length thereof by the provision thereof of a plurality of spaced apart radially inwardly depressed portions on the radially outwardly facing outer fold edges of the filter element that serve to space adjacent sides of the folds of the element apart from one another to maintain a predetermined fixed spacing between the folds of the elements between the depressed portions therein serving as inlets into the filter element.

A further object of the present invention is to improve replaceable filter cartridges for filtering and conditioning dry cleaning solvent and the like of the type including a cylindrical perforated outer shell that encloses a filter paper tube or element having a plurality of folds throughout the length thereof by the provision of a plurality of spaced apart depressions in the outer fold edges of the element that are aligned in axial abutting relationship around the circumference of the filter element to form a depressed flat surface on the element on which is received a bead of plastisol adhesive and wherein the depressions are circumferentially and axially aligned to form continuous surfaces that block the flow of plastisol adhesive radially inwardly of the filtering element between surfaces of folds.

Still another object of the present invention is to improve the manufacture of filter paper elements for association with filter cartridges by the provision of an improved method including the steps of alternately scoring a predetermined blank of filter paper at spaced apart points along the length thereof wherein the scored portions of the paper include score lines completely across the width of the blank and other score lines that extend only across a part of the width of the blank of paper and include Y-shaped score lines thereon and the further step of folding the paper along the score lines to form inner fold edges on the element that are continuous across the width of the element and outer fold edges that have a plurality of spaced apart depressions therein that serve to space adjacent ones of the folds of the element at the outer edge thereof.

Further objects and advantages of the present invention will be apparent from the following description, reference being had to the accompanying drawings wherein a preferred embodiment of the present invention is clearly shown.

In the drawings:

FIGURE 3 is a perspective view of a paper filter element of the cartridge of FIGURE 1 in an intermediate step of the method of manufacture thereof;

FIGURE 4 is a schematic view of a machine for carrying out scoring and folding steps in the improved method of forming the filtering element of the present invention;

FIGURE 5 is an enlarged, fragmentary view of a tool of the machine in FIGURE 3 for forming certain of the score lines on the filtering element of the present invention; and FIGURE 6 is a view showing a portion of the filtering element with one of the score lines formed therein.

Figure 1:
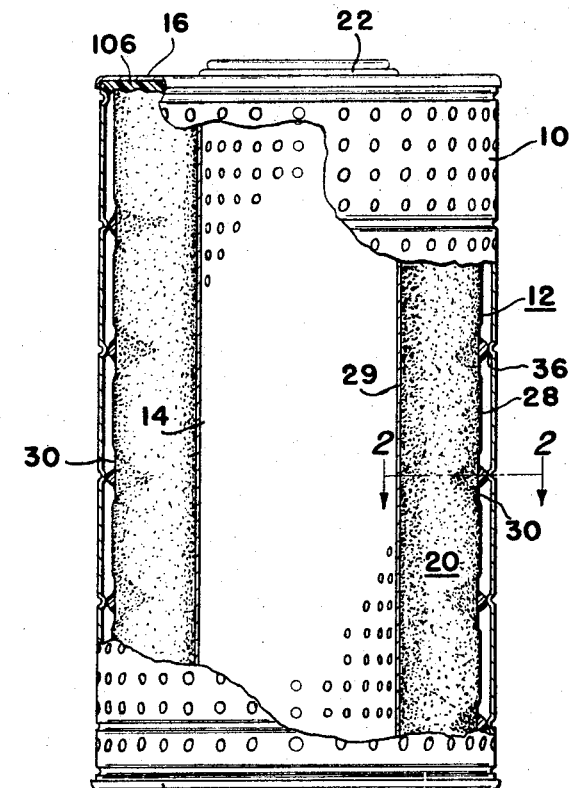
FIGURE 1 is a diametrical, side elevational view, partially in elevation, of the disposable filter cartridge of this invention.

Referring now to FIGURE 1, a replaceable filter cartridge is illustrated including a cylindrical perforated outer shell 10 that encloses a tubular paper filter element 12. Within the filter paper element 12 is located a cylindrical, perforated support or separator tube 14 that is spaced from the outer shell 10 by an annular upper end plate 16 and an annular lower end plate 18 located parallel to the upper end plate 16. The perforated cylinders 10 and 14 form therebetween a first-stage solvent filtering chamber 20 in which the tubular element 12 of folded or accordion pleated filter paper is located to filter solvent passing through the perforations of the outer shell 10 into the cartridge to remove contaminants therefrom such as dirt, lint, hair and other like particulate matter.

The perforations in the support or separator tube 14 serve as the inlet to a solvent conditioning chamber (not shown) into which the solvent passes from the solvent filtering chamber 20 to be conditioned so as to remove dyes and other dissolved contaminants in the dry cleaning solvent. A representative form of a suitable solvent conditioning chamber is more particularly set forth in United States Patent No. 3,189,179, issued June 15, 1965. As is more specifically set forth in the above cited patent, such a solvent conditioning chamber includes a center or outlet tube that is perforated to receive solvent that is passed through openings in a top cover 22 and a bottom cover 24 located in the end plates 16 and 18, respectively, as more particularly set forth in the McMichael patent.

Figure 2:
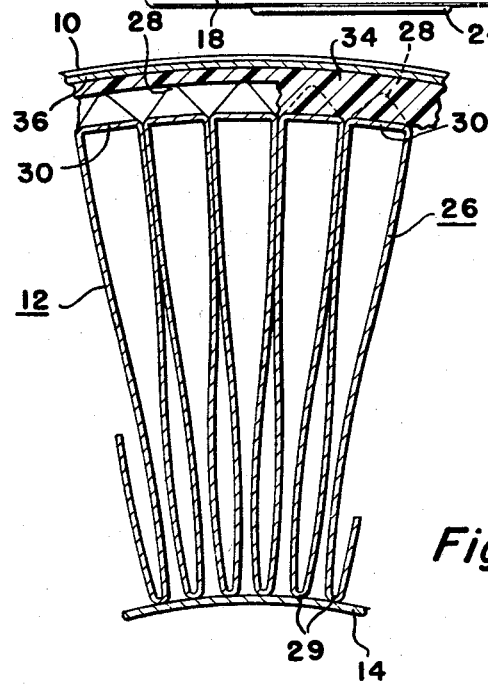
FIGURE 2 is an enlarged, fragmentary, sectional view taken along the line 2—2 of FIGURE 1.

In accordance with certain principles of the present invention, and as best seen in FIGURE 2, the tubular filter paper element 12 includes a plurality of folds 26 each including an outer fold edge 28 and an inner fold edge 29. The inner fold edges 29 are located in abutting relationship with the support tube 14 and, as best seen in FIGURE 1, the outer fold edges 28 of the filtering element 12 are located in spaced relationship radially inwardly of the inner surface of the outer shell 10 to prevent undesirable rubbing between the outer shell 10 and the filter element 12 at the outer periphery thereof.

Each of the outer fold edges 28 of the filter element 12 has a plurality of spaced apart depressed portions 30 formed along the length thereof and as seen in FIGURES 2 and 3, the depressed portions 30 on adjacent ones of the folds 26 are located in alignment with one another around the outer circumference of the filter 12 to provide a continuous circumferentially located flat surface on the outer periphery of the filter element 12 located radially inwardly of the outer limits of the outer edges 28 therein.

The depressed portions 30 are located in axial abutment with one another to serve as spacers for maintaining the remainder of adjacent ones of the fold edges 28 apart from one another to define a plurality of inlet openings 32 in the filtering element, best seen in FIGURE 3, to receive solvent that passes inwardly through the shell 10. Additionally, the aligned, depressed portions 30 on the outer edges 28 of the element form a flat surface thereon in which is received a bead of plastisol adhesive 34. By virtue of the axial abutting relationship of the depressed portions 30 on the outer edges 28, the bead 34 will not flow radially inwardly of the filter element from the surfaces 30 thereon whereby the amount of bead 34 is limited to an amount required to form a bead that is located in engagement with internal ribs 36 formed by a radially inwardly directed grooved portion on the outer shell 10 around the circumference thereof at spaced apart points along the length thereof. The contact between the beads 34 and the ribs 36 effect an axial alignment between the paper filter element 12 and the outer shell 10 and furthermore assures that the filter element 12 will be centered within the outer shell 10 in spaced relationship with respect thereto to prevent undesirable rubbing therebetween.

In FIGURE 2, a segment of one of the beads 34 is illustrated showing how the depressed portions 30 of the outer edges 28 prevent it from flowing radially inwardly of the filtering element. Furthermore, a part of the bead 34 is broken away to show how it is located radially outwardly of the edges 28 in contact with one of the ribs 36 to produce the alignment of the filtering element 12 and outer shell 10 and the separation of the outer periphery of the filtering element 12 from the outer shell 10. The folds 26 have longitudinal corrugations 38 therein which communicate with openings 32 to distribute solvent across the full outer face of the unit 12.

In accordance with certain other of the principles of the present invention, the filter element 12 is formed by an improved method wherein the inner and outer fold edges therein and the depressed surface portions on the outer fold edges are continuously formed in the element and wherein the plastisol is applied to the outer edges of the filter element to connect the outer periphery of the filter together to space the folds at the outer surface of the filtering element between the depressions to form a relatively opened planar extent at the outer periphery of the folded filter paper for the passage of solvent into the filter.

More particularly, in accordance with the improved method, a blank of filter paper having a predetermined length and width is provided with a plurality of longitudinally directed corrugations 38 along the length thereof. As shown in FIGURE 4 the blank of filter paper is passed through a scoring station 40 including an upper roll 42 supported off a suitable frame work 44 by means including a shaft 46. A plurality of scoring tools 48 are located in roll 42 about its outer circumference. Each of the tools 48 includes a score edge 50 at the outer periphery thereof adjacent the outer periphery of the roll 42. The roll 42 includes a plurality of spaced apart peripheral grooves 52, one of which is shown.

In conjunction with the upper roll 42, the scoring station 40 includes a lower roll 54 supported by a shaft 55 on framework 44. A plurality of scoring tools 56 are supported in the roll at circumferential points therearound. Each of the tools 56 includes a head that is formed at 58 and 60 to define a straight score line 62 that is divided at 64 and 66 to form a first Y-shaped score pattern on the head of the tool 56. The tool includes a second portion with formed sides 68, 70 that define a second straight score 72 that is divided into score lines 74, 76 to form a second Y-shaped pattern on the scorehead spaced apart from the first Y-shaped score pattern by a predetermined distance which in the illustrated machine is represented by the width of one of a plurality of circumferential grooves 78 formed in the roll 54.

The roll 54 is supported by the shaft 55 so that the outer peripheral surfaces of the rolls 42, 54 are located in close spaced relationship with one another to receive the blank of corrugated filter paper as best seen in FIGURE 4. The rolls 42, 54 are driven to advance the tools 48 and 56 with respect to the paper filter blank as it passes through the close space between the rollers as seen in FIGURE 4 so that the straight score lines 50 on tools 48 will form a first plurality of spaced apart straight score lines on one side of the filter element blank across the width thereof. Rotation of the rolls 42, 54 will cause the heads of the tools 56 to form a score line shown in FIGURE 6 across the length of the paper at spaced apart points therealong which can be characterized as including straight line portions 80 and broken line portions 82, 84 across the width of the paper that result in a plurality of unscored regions 86, one of which is shown, each bounded by the broken score lines 82, 84. The straight score lines and interrupted score lines in the filter paper blank are formed in an alternate fashion along the length of the blank filter paper element in a continuous fashion by the rolls 42, 54.

As the scored filter element blank leaves the rolls 42, 54, it is picked up by a plurality of upper and lower guide rails 88, 90 spaced apart across the width of the paper. A tapered nose portion 92 on each of the upper rails 88 of the machine and a tapered nose portion 94 on each of the lower rails 90 of the machine are located, respectively, in the grooves 52 and 78 of the rollers 42 and 54. As the scored paper is directed between the rails 88, 90, it is forced together to be folded along the continuous score lines and interrupted score lines to form the inner fold edges 29 of the filter element 12 at the continuous score lines and the outer edges 28 of the filter element 12 along the interrupted score lines. Each of the rails 88 has a depending portion 96 thereon which engages the scored regions 86 in the paper to depress the region inwardly with respect to the outer edge 28 of the folds to form the flat surface portions or depressed portions 30 of the filter element 12. Side rails 97 (one being shown) engage the sides of the filter element 12 as it is being folded.

In the illustrated machine for scoring and forming folded filter elements, the folded paper is picked up by continuous belts 98, 100 driven through means including pulleys 102, 104, respectively. As the folded element is directed from the scoring station 40 through the guide rails 88, 90, 97, the filter element is directed with respect to an adhesive applying station, shown diagrammatically in FIGURE 4, wherein five nozzles 106 are located to lay down five of the plastisol beads 34 on the depressed surface portions 30 of the filter paper to form a layer of adhesive through the length of the filter element 12 that is maintained by the depressed surface portions 30 thereon at the outer periphery of the filter element without flowing between the folds therein. The adhesive is then partially cured in an oven so that, when cool, there is sufficient mechanical strength to hold the folded element to a predetermined length. In the illustrated arrangement, the control of spacing at the outer edges of the folded paper element 12 to form the openings 32 therein is established by the depressed portions 30 of the outer edges 28 of the filtering element automatically during the folding step discussed above.

Furthermore, the depressed portions 30 form continuous trough-like depressions as seen in FIGURE 4 to confine the plastisol as it is being directed against the filter element 12 during the formation of the element into a tubular folded member. Accordingly, the amount of plastisol required to form a bead across the filter element to obtain the axial alignment and spacing of the filter element 12 in the replaceable filter cartridge is maintained at a minimum amount required to produce the bead as shown in FIGURE 1 without wasting any of the plastisol adhesive by flow of the adhesive into the interior of the filter element along the side walls of the folds therein.

After the adhesive has been partially cured, the length of folded paper is handled and wrapped into the tubular form shown in FIGURE 1. In its wrapped or rolled tubular form, as pointed out above, the strips of plastisol forming the beads 34 align themselves, respectively, with the internal ribs 36 on the outer shell 10. In the illustrated arrangement the free ends 108, 110 of the filter element are coated with adhesive such as plastisol along the length of the fold and sealed to each other.

The folded paper element, once in a tubular form, is inserted into the outer perforated shell 10 and a film of adhesive 106 seals the end of the filter element 12 to the adjacent end plates 16, 18 of the filter cartridge. The entire outer assembly including the outer shell 10, the end plates 16, 18 and the filter element 12 are then placed in an oven for final cure of the adhesive portions of the unit.

By virtue of the above-illustrated machine arrangement which is representative of one way of scoring and folding the paper, the filter paper element can be continuously formed into predetermined lengths of reversely folded paper so as to have a preformed plurality of depressed portions at the outer fold edges to serve as a defined region on the outer edge of the filter element that receives an adhesive bead for purposes discussed above. Furthermore, the continuously formed filter paper element is folded in a manner whereby the outer edges of the folded element will have spaced apart depressions therein that act to space the outer edges of the folded paper in a controlled fashion to maintain a controlled spacing between the paper folds at the outer periphery thereof to assure an adequate open area in the filter element for the passage of solvent into the interior thereof for removing particulate matter from the solvent.

While the embodiment of the present invention as herein disclosed constitutes a preferred form, it is to be understood that other forms might be adopted.

What is claimed is as follows:

1. A method of folding a filter paper element for inclusion in a cylindrical filter cartridge comprising the steps of, providing a blank of filter paper having a predetermined width and length, passing the blank of paper in a predetermined direction through rollers to fully score one side of the paper completely across the width thereof at selected spaced apart points therealong, interruptingly scoring the filter paper by the rollers on one side thereof part way across the width thereof between each of the selected spaced apart points to form a plurality of flat surface regions through the width of the paper having the outer limits thereof bounded by spaced apart Y-shaped lines, folding the paper to have a plurality of inner fold edges at the fully scored portions of the filter paper and a plurality of outer fold edges at the partially scored portions of the paper, depressing the flat surfaces at spaced apart points along each of the outer fold edges to form circumferentially aligned, radially inwardly depressed troughs on the outer fold edges, and spacing adjacent outer fold edges in the paper from one another by locating the flat surface portions in adjacent fold edges in abutting relationship with one another.

2. A disposable cartridge for use with dry cleaning solvent comprising, a perforated cylindrical outer shell adapted to receive solvent to be filtered and conditioned, a perforated support tube concentric with said outer shell and in spaced relationship therewith defining an inlet opening to a center region of the cartridge, an annular imperforate end plate at each end of said cartridge connecting said outer shell and said support tube in spaced relationship respectively along the outer and inner peripheral edges of said end plates to define an annular solvent filtering chamber, a tube of longitudinally folded filter paper in said filtering chamber for removing particulate matter from solvent flowing therethrough, said folded filter paper including a plurality of spaced apart fold edges on the outer periphery thereof radially inwardly of the inner surface of said outer shell, each of said fold edges having a plurality of radially inwardly depressed substantially flat surfaces thereon, said surfaces being in abutment between adjacent outer fold edges to maintain a predetermined spacing between the folds of said filter paper, said surfaces being aligned circumferentially of said tube of folded filter paper, a layer of plastisol on said circumferentially aligned surfaces extending radially outwardly of said outer peripheral fold edges for reinforcing said tube of folded filter paper, said circumferentially aligned surfaces blocking plastisol flow radially inwardly between said folds.

3. A disposable cartridge for use with dry cleaning solvent comprising, a perforated cylindrical outer shell adapted to receive solvent to be filtered and conditioned, a perforated support tube concentric with said outer shell and in spaced relationship therewith defining an inlet opening to a center region of the cartridge, an annular imperforate end plate at each end of said cartridge connecting said outer shell and said support tube in spaced relationship respectively along the outer and inner peripheral edges of said end plates to define an annular solvent filtering chamber, a tube of folded filter paper in said filtering chamber for removing particulate matter from solvent flowing therethrough, said folded filter paper including a plurality of spaced apart fold edges on the outer periphery thereof radially inwardly of the inner surface of said outer shell, spacer means on each of said outer fold edges extending between the folds for maintaining a predetermined spacing between the folds of said filter paper, said spacer means extending continuously circumferentially around said tube of folded filter paper to define a surface between said outer fold edges and said support tube, a bead of plastisol on said spacer means surface extending radially outwardly of said outer peripheral fold edges for reinforcing said tube of folded filter paper, said circumferential spacer means surface defining a barrier to flow of plastisol radially inwardly of said folds.

4. A disposable cartridge for use with dry cleaning solvent comprising, a perforated cylindrical outer shell adapted to receive solvent to be filtered and conditioned, a perforated support tube concentric with said outer shell and in spaced relationship therewith defining an inlet opening to a center region of the cartridge, an annular imperforate end plate at each end of said cartridge connecting said outer shell and said support tube in spaced relationship respectively along the outer and inner peripheral edges of said end plates to define an annular solvent filtering chamber, a tube of folded filter paper in said filtering chamber for removing particulate matter from solvent flowing therethrough, said folded filter paper including a plurality of spaced apart fold edges on the outer periphery thereof radially inwardly of the inner surface of said outer shell, spacer means on each of said outer fold edges extending between the folds for maintaining a predetermined spacing between the folds of said filter paper, said spacer means extending continuously circumferentially around said tube of folded filter paper to define a surface between said outer fold edges and said support tube, a bead of plastisol on said spacer means surface extending radially outwardly of said outer peripheral fold edges for reinforcing said tube of folded filter paper, said circumferential spacer means surface defining a barrier to flow of plastisol radially inwardly of said folds, said spacer means being located at spaced apart points through the length of certain of said outer fold edges, said spacer means including a plurality of abutting surfaces circumferentially aligned about said tube of folded filter paper and generally radially indented of said outer fold edges, said plastisol bead extending part radially outwardly of said outer fold edges and part radially inwardly of said outer fold edges to an extent determined by the radial indentation of said flat surfaces.

References Cited

UNITED STATES PATENTS

| | | | |
|---|---|---|---|
| 2,792,124 | 5/1957 | Buckman | 210—457 |
| 2,908,350 | 10/1959 | Buckman | 210—493 X |
| 3,058,594 | 10/1962 | Hultgren | 210—493 |
| 3,189,179 | 6/1965 | McMichael | 210—457 X |

SAMIH N. ZAHARNA, *Primary Examiner.*

REUBEN FRIEDMAN, *Examiner.*

F. SPEAR, *Assistant Examiner.*